(12) United States Patent
Ceylan et al.

(10) Patent No.: US 7,507,388 B2
(45) Date of Patent: Mar. 24, 2009

(54) PROCESS FOR PRODUCTION OF DENSE SODA, LIGHT SODA, SODIUM BICARBONATE AND SODIUM SILICATE FROM SOLUTIONS CONTAINING BICARBONATE

(75) Inventors: Ismail Ceylan, Ankara (TR); Ali Ugurelli, Ankara (TR); Noyan Dilek, Ankara (TR)

(73) Assignee: Eti Soda Uretim Pazarlama Nakliyat VE Elektrik Uretim Sanayi VE Ticaret A.S., Ankara (TR)

( * ) Notice: Subject to any disclaimer, the term of this patent is extended or adjusted under 35 U.S.C. 154(b) by 168 days.

(21) Appl. No.: 11/274,678

(22) Filed: Nov. 14, 2005

(65) Prior Publication Data

US 2006/0182675 A1 Aug. 17, 2006

(30) Foreign Application Priority Data

Nov. 11, 2004 (TR) .......................... A 2004 03060

(51) Int. Cl.
| | | |
|---|---|---|
| C01D 7/12 | (2006.01) | |
| C01D 1/32 | (2006.01) | |
| C01D 3/16 | (2006.01) | |
| C01D 7/26 | (2006.01) | |
| C01D 7/00 | (2006.01) | |
| C01D 15/08 | (2006.01) | |
| C01D 17/00 | (2006.01) | |
| C01D 5/00 | (2006.01) | |
| C01D 7/24 | (2006.01) | |
| C22B 26/10 | (2006.01) | |
| B01D 9/00 | (2006.01) | |
| C13K 1/10 | (2006.01) | |
| C30B 17/00 | (2006.01) | |
| C01G 9/02 | (2006.01) | |

(52) U.S. Cl. .................. 423/206.2; 423/184; 423/206.1; 423/421; 423/426; 423/623; 23/297; 23/298; 23/300; 23/302 T

(58) Field of Classification Search ................ 423/623, 423/206.2, 206.1
See application file for complete search history.

(56) References Cited

U.S. PATENT DOCUMENTS

| 3,425,795 | A | * | 2/1969 | Port et al. .................... 423/201 |
| 5,262,134 | A | * | 11/1993 | Frint et al. ................... 423/184 |
| 5,283,054 | A | * | 2/1994 | Copenhafer et al. ....... 423/206.2 |
| 6,228,335 | B1 | * | 5/2001 | Copenhafer et al. ....... 423/206.2 |
| 6,428,759 | B1 | * | 8/2002 | Smith et al. ............... 423/206.2 |
| 6,576,206 | B2 | * | 6/2003 | Copenhafer et al. ....... 423/206.1 |
| 6,589,497 | B2 | * | 7/2003 | Smith ......................... 423/421 |
| 6,609,761 | B1 | * | 8/2003 | Ramey et al. .................. 299/5 |
| 2006/0182675 | A1 | * | 8/2006 | Ceylan et al. ............ 423/206.2 |

* cited by examiner

*Primary Examiner*—Jerry Lorengo
*Assistant Examiner*—Jennifer A Smith
(74) *Attorney, Agent, or Firm*—Kenyon & Kenyon LLP

(57) ABSTRACT

A process related to sodium chemicals production, including the processing of bicarbonate containing solutions obtained by solution mining of trona, nahcolite or wegscheiderite reserves and the lake waters containing bicarbonates, includes the steps of purification, evaporation-decarbonation, crystallization, centrifuging, and drying.

14 Claims, 2 Drawing Sheets

PROCESS FOR PRODUCTION OF DENSE SODA, LIGHT SODA, SODIUM BICARBONATE AND SODIUM SILICATE FROM SOLUTIONS CONTAINING BICARBONATE

CROSS-REFERENCE TO RELATED APPLICATIONS

The present application claims priority to Application No. 2004/03060, filed in the Republic of Turkey on Nov. 11, 2004, which is expressly incorporated herein in its entirety by reference thereto.

FIELD OF THE INVENTION

The present invention relates to a process for producing dense soda ash, sodium bicarbonate, light soda ash and sodium silicate from the bicarbonate containing solutions obtained by solution mining of trona, nahcolite or wegscheiderite reserves and the lake waters containing bicarbonates. Example embodiments of the present invention may optimize such a process, decreasing the amount of wastes and tailings by recovering them as final products.

BACKGROUND INFORMATION

Production of dense soda ash via monohydrate and sesquicarbonate methods from bicarbonate containing solutions is believed to be conventional. Dense soda ash production by the monohydrate method is described in U.S. Pat. No. 6,589,497. According to U.S. Pat. No. 6,589,497, the solution including bicarbonate is purified by conventional techniques and sodium bicarbonate is converted into sodium carbonate in the stripping column (single or double stage).

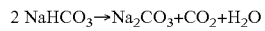

$$2\ NaHCO_3 \rightarrow Na_2CO_3 + CO_2 + H_2O$$

The rest of the bicarbonate that could not be converted within the stripping columns is converted by using caustic within the neutralization process.

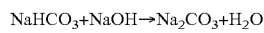

$$NaHCO_3 + NaOH \rightarrow Na_2CO_3 + H_2O$$

Decarbonated solution is fed to the monohydrate crystallizer after being concentrated within evaporator. The slurry formed within the crystallizer is sent to the centrifuging process. Here, the monohydrate cake and the filtrate are separated from each other. Due to increasing concentration of the solution, the impurities within the solution also become concentrated. In order to achieve a marketable product quality, the impurities should be kept at a constant concentration. For this purpose, part of the filtrate is regularly purged. The purge rate is decided considering the amount of impurities within the solution including bicarbonate and the marketable product quality. The monohydrate cake effluent from the centrifuging process is dried in the rotary or fluidized bed driers (direct flame contact or indirect steam driers may be used) and thus dense soda ash is obtained. The purge is used to produce sodium carbonate decahydrate crystals within the decahydrate crystallization system. These crystals are melted and sent back to the monohydrate crystallization process. The filtrate effluent from the decahydrate centrifuge is the final purge from the system. The decahydrate crystals reject the impurities from their crystal structure. Due to this property, product recovery and decrease in the final waste amount is achieved. However, the bicarbonate content in the solution is completely neutralized and thus a significant amount of caustic is consumed. Yet, according to the phase diagram, instead of completely neutralizing, it is sufficient to decrease the bicarbonate content down to values just below the invariant point in order to obtain only sodium carbonate monohydrate crystals in the crystal phase. Thus the caustic consumption may be decreased.

Dense soda ash production via another similar process is described in U.S. Pat. No. 6,576,206. However, it is stated that, with solutions having bicarbonate concentration below the invariant point may be fed to the crystallizer and still monohydrate crystals may be obtained. U.S. Pat. No. 6,576,206 does not indicate any neutralization process. However, the significant amount of product loss with the purge to be discarded from the system is not taken into consideration. As explained below, it may be possible to send the purge stream to a Decahydrate Process to minimize the product loss and the final process waste. On the other hand, it may be possible to alter the operation parameters of the decahydrate process and switch to sesquicarbonate crystals production, considering the concentration of impurities in the bicarbonate containing solution and the system. Following this, the sesquicarbonate crystals may either be melted and recovered in the monohydrate process or fed to the light soda ash process and recovered as light/medium soda ash product. In this manner, it may be possible to apply two different processes within the same equipment and thus increase the product variety.

Production of sodium bicarbonate form the solutions obtained from nahcolite ore reserves by high temperature dissolution, by the carbonation process is described in U.S. Pat. No. 6,609,761 and U.S. Pat. No. 6,699,447. Through out the world, Sodium Carbonate production is believed to be carried out by decarbonation, purification, carbonation and drying process steps since 1800s.

The conventional method of sodium bicarbonate production process is applied to the solutions obtained from the nahcolite ore reserves. Application of this process to the solutions obtained by solution mining of trona, nahcolite and wegscheiderite ore reserves and to the lake waters including bicarbonate is not explained in this previous technique.

Production of decahydrate crystals from solutions containing bicarbonate obtained by solution mining is described in U.S. Pat. No. 5,283,054. Prior to decahydrate crystallization, all of the bicarbonate within the solution is neutralized by caustic soda addition. The caustic soda utilized for this purpose is produced by treating a portion of the raw solution including bicarbonate with calcium oxide. Since the decahydrate crystal rejects the impurities, the purity of the caustic soda solution to be used within this process is not essential. For this purpose, it may be beneficial to produce the caustic soda from monohydrate purge instead of the raw solution, considering the cost and waste management issues.

The glass producers in European, Middle East and North African markets are believed to mainly use dense soda ash. The textile and detergent industries of the same markets are believed to prefer light soda ash. The light soda ash is produced by the synthetic method for this market. Although both dense and light soda ash have the same chemical properties, they differ from each other considering bulk density and granular structure. The bulk density of dense soda ash is 0.90 to 1.3 gr/cm$_3$ where as that of light soda ash is 0.45 to 0.65 gr/cm$_3$. Light soda ash is in powder form. The particle size distribution of dense soda ash is between 0.15 mm and 1 mm.

Sodium carbonate production is performed both in synthetic and natural soda processes via conventional methods (carbonation). In these methods, the solution fed to the sodium bicarbonate production process is purified and sent to the carbonation columns. The sodium bicarbonate crystals obtained from the carbonation columns are centrifuged, dried and thus sodium bicarbonate product obtained.

The commercial dense soda ash product is regulated with respect to particle size. Generally, the rate of the particles smaller than 75 μm is desired to be less than 1% in the dense soda screen analyze. In order to produce such a product, vibratory screens are used at the drying process (150). Sodium carbonate monohydrate crystals may vary in particle size distribution due to impurities within the fed solution consisting bicarbonate (109) and the changes in operational conditions of the crystallizer (130). Generally, the rate of the particles smaller than 75 μm is about 2 to 5%. In conventional techniques, the under screen dense soda ash and the light and dense soda ash dusts held at the dedusting systems are dissolved again and fed to the monohydrate crystallizer.

Conventionally, the soda ash fines having lower economical value due to particle size are dissolved and fed back to the production process. Nevertheless, this method is wasteful considering the final product cost.

On the other hand, a process for melting the light soda ash or soda ash fines together with sodium carbonate decahydrate crystals at high temperature in order to obtain sodium carbonate monohydrate crystals and production of dense soda ash via drying of these crystal is described in U.S. Pat. No. 5,759,507.

$$9\ Na_2CO_3 + Na_2CO_3.10\ H_2O \rightarrow 10\ Na_2CO_3.H_2O$$

SUMMARY

An example embodiment of the present invention may provide a process for producing dense soda ash, sodium bicarbonate, light soda ash and sodium silicate from the bicarbonate containing solutions obtained by solution mining of trona, nahcolite or wegscheiderite reserves and the lake waters containing bicarbonates.

An integrated process for production of the chemicals mentioned above may be provided, the caustic consumption required for such a process may be minimized and thus the production cost may be decreased. Also with the integrated process described herein, high process flexibility may be provided, thus decreasing the production cost and supplying diversified requirements of the alkali consumers.

An example embodiment of the present invention may provide for process optimization and decreasing the amount of wastes with the deca/sesqui process indicated and reclaim them as a product.

An example embodiment of the present invention may provide for dense soda particle size increase during the mentioned process.

DETAILED DESCRIPTION

Figure 1:
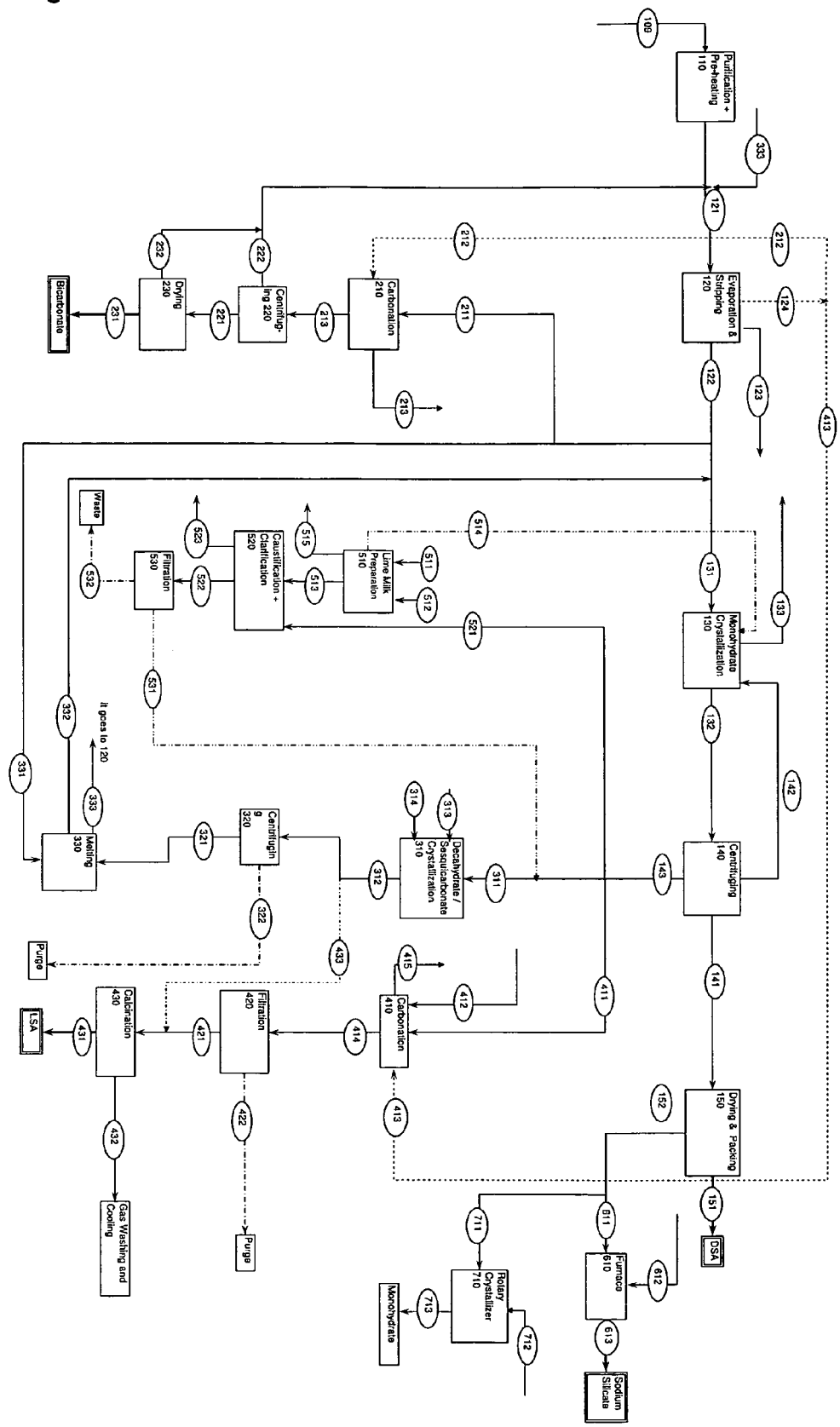
FIG. 1 is a flow diagram of an example embodiment of the present invention.

Through the process hereoof, dense soda ash, sodium bicarbonate, light soda ash and sodium silicate is produced from the bicarbonate containing solutions obtained by solution mining of trona, nahcolite or wegscheiderite reserves and the lake waters including bicarbonates, decreasing the amount of wastes and tailings by recovering them as final product and process optimization.

In the process, the bicarbonate concentration is below the invariant point within the feed solution to the monohydrate crystallizer (131). In this stream, the bicarbonate concentration is less than 2%. The bicarbonate concentration of the filtrate (142) may be as high as 4.6%. The purge stream sent to the deca/sesqui process (311) is neutralized with caustic soda addition (531) and crystallized within the deca/sesqui cooling crystallizer (310) at 15 to 30° C., obtaining slurry (312) including sodium carbonate decahydrate crystals. The slurry (312) is separated as the decahydrate cake (321) and the final purge (322) at the decahydrate centrifuge (320). Operating at 30 to 70° C. and without any caustic addition, sodium sesquicarbonate crystals are obtained within the deca/sesqui crystallizer.

Bicarbonate containing ore bodies may include various impurities. Considering the amount of impurities within the bicarbonate consisting solution (109), either decahydrate or sesquicarbonate crystals may be produced within the deca/sesqui process. Decahydrate crystals (321) are melted within the melting process (330) by a portion of the solution (331) effluent from the evaporation-stripping process. The sesquicarbonate crystals on the other hand are melted within the melting process (330) by a portion of the solution (331) effluent from the evaporation-stripping process. As an alternative, the sesquicarbonate crystals (433) are fed to the calcination process (430) and thus light/medium soda ash (421) production is provided. Accordingly, a high process flexibility, product diversity according to the requirements of the market and decrease in the production cost may be achieved. The solution obtained by melting the decahydrate crystals (332) is fed back to the monohydrate crystallization process (130). The solution obtained by melting the sesquicarbonate crystals (333) is sent to the evaporation-stripping process (120). Two different kinds of crystals (decahydrate or sesquicarbonate) may be obtained from the same cooling type crystallizer by only changing the operation parameters. Decahydrate crystals are produced in the deca/sesqi process, in case that rate of impurities is too much within the raw solution consisting bicarbonate (109), and sesquicarbonate crystals are produced in case the rate of impurities are rather low. Sesquicarbonate crystal production is a less energy consuming process compared to the decahydrate process. It may be beneficial to produce different crystals within the same equipment by only changing the operational parameters considering the investment cost.

In order to increase the dense soda ash particle size, a portion of the milk of lime (514) obtained from the lime preparation process (510) is fed to the monohydrate crystallization process feed solution (131) so that the $Ca^{+2}$ concentration within this solution is about 20 to 60 ppm.

The caustic soda (531) production is done from a portion of purge stream (521) taken from the monohydrate process. Since the decahydrate crystal rejects the impurities, the purity of the caustic soda solution to be used within this process is not essential. For this purpose, it may be provided to produce the caustic soda from monohydrate purge instead of the raw solution, considering the cost and waste management issues.

The pre-purification step in the sodium bicarbonate production process is omitted. A portion of the purge (411) having some impurities or any other bicarbonate solution (109) having high impurity rate is fed directly to the carbonation process (410) and the sodium bicarbonate crystals (421) obtained by centrifuging (420) are calcined (430) and thus light soda ash (431) is produced.

A portion of the smaller particle size soda ash (811) is furnaced at 1400 to 1600° C. (610) together with quartz sand (812) in order to produce sodium silicate (2 modules or 3 modules) (613). Thus, instead of feed them back into the process, the fines having less economical value are put into use in order to obtain a new product having higher economical value.

In this process, a portion of the under screen dense soda ash and the light and dense soda ash dust held at the dedusting systems (711) is recrystallized by spraying process condensate at 60 to 100° C. (712) in a rotary crystallizer (710). The recrystallization reaction is as below. Since temperature may be an important parameter, the soda fines having a temperature of 60 to 150° C. are used within this process.

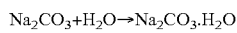

The hot water amount (712) sprayed into the rotary crystallizer (710) is about twice the theoretical amount required for monohydrate crystal production. The obtained sodium carbonate monohydrate crystals (713) are sent to the monohydrate drying process (150) and recovered as dense soda ash product. The soda ash fines smaller than 75 µm are processed via this method and soda crystals larger than 100 µm are obtained.

The process is illustrated in FIG. 1.

The process of dense soda ash, sodium bicarbonate, light soda ash and sodium silicate production from the bicarbonate containing solutions obtained by solution mining of trona, nahcolite or wegscheiderite reserves and the lake waters containing bicarbonates is explained below in detail.

The solution consisting bicarbonate obtained by solution mining of trona, nahcolite or wegscheiderite reserves and the lake water containing bicarbonates (109) is purified and preheated at 30 to 80° C. (110). The concentration of the solution (109) may be 5 to 20% total alkalinity (as sodium carbonate) and the bicarbonate concentration may be 1 to 7%. For example, the concentration of the solution may be 14 to 17% total alkalinity (as sodium carbonate). Following the purification process that may be performed by conventional techniques (powdered or granular activated carbon treatment and press or cartridge filtering), the raw solution is preheated to 40 to 90° C. by process condensate (123 and 133). During the purification (110), the insolubles and the organic carbons within the solution (109) are removed. In some cases, surface activated materials such as diatomaceous earth or zeolite may be used as adsorbent medium.

The purified and preheated solution (111) is mixed together with the filtrate (222) effluent from the sodium bicarbonate centrifuging process (220) and sesquicarbonate solution (333) effluent from the deca/sesqui system melting process (330) and sent (121) to the evaporation-stripping process (120). Within this process (120), a first stage evaporator, a first stage stripper, a second stage stripper and a second stage evaporator exist. Within this system (120), mechanical vapor compressors are used. The heat source used in the system is lowpressure steam (e.g., 1.5 to 2.5 bar absolute). Thermal vapor compressors may be used instead of mechanical vapor compressors considering the process conditions (power-steam balance in power plant). The solution (122) effluent from the evaporation-stripping process (120) has a total alkalinity of 24 to 28%, a sodium bicarbonate concentration of 0.5 to 2%, and its temperature is 100 to 105° C. A portion of the concentrated solution (211) is sent to the sodium bicarbonate carbonation process (210), and another portion to the (331) deca/sesqui melting process (330). The rest of the concentrated solution is mixed with the decahydrate solution (332) coming from the deca/sesqui melting process (330) and fed to the (131) monohydrate crystallization process (130).

Low pressure steam (e.g., 1.5 to 2.5 bar absolute) is used within the monohydrate crystallization system (130) as the heat source and mechanical vapor recompressors are utilized for energy saving purposes. Milk of lime (514) taken from the milk of lime preparation process (510) is injected to the feed solution (131) by dozing pumps in order to modify the crystal size during crystallization. The rate of injection is adjusted such that the calcium concentration within the feed solution (131) is 30 to 60 ppm.

The condensate (123 and 133) effluent from the evaporation-stripping (120) and monohydrate crystallization (130) processes is used at various points of the process, at demineralized water production for power plant and as solution mining solvent injection fluid. A portion of the carbon dioxide gas (212) effluent from the evaporation-stripping (120) process is used in production of sodium bicarbonate and another portion (413) is used at the light soda ash production process. The slurry (132) including 20 to 30% crystal, a total alkalinity of 30 to 33% and a temperature of 100 to 105° C., effluent from the monohydrate crystallization process (130) is fed to the centrifuging process (140). Most of the filtrate (142) effluent from the centrifuging process (140) is fed back to the monohydrate crystallization system (130).

At the centrifuging process (140), the slurry including 20 to 30% crystals (132) is first concentrated to 45 to 60% crystal content within the hydro cyclones, and then sent to the two stage pusher centrifuge to separate the monohydrate cake with 0.5 to 5% moisture content (141) and the filtrate (142 and 143) having a total alkalinity of 29 to 31% and a crystal content of 1 to 3%. The monohydrate cake (141) effluent from the centrifuging process is fed to the drying and packing process (150). In this process, rotary or fluidized bed driers are used. Indirect steam may be used as a heating medium. In some instances, direct contact driers (fuel-oil, natural gas, LPG, etc.) are also used. Within the driers the drying temperature is 130 to 180° C. and, e.g., 150 to 160° C.

Double stage screening system is used within the drying and packing process (150) in order to adjust the product particle size distribution. The over screen large particle soda ash is directly fed to the deca/sesqui melting process (330) and taken back into the process. A portion of the under screen soda ash fines (611) is fed to the sodium silicate system (610) and the rest (711) is consumed in the rotary crystallizer system (710).

Typical specifications of the dense soda ash product (151) effluent from the drying and packing process are given below.

| | |
|---|---|
| Bulk Density: | 0.95 to 1.06 g/cm$_3$ |
| Particle Size Distribution: | +1000 microns: %0 |
| | +600 microns: %5 max |
| | +425 microns: %30 max |
| | +150 microns: %85 min |
| | −75 microns: %1 max |
| Na$_2$CO$_3$: | %99.5 min |

-continued

| | |
|---|---|
| Free Moisture: | %0.05 max |
| NaCl: | %0.2 max |
| $SO_4^{-2}$: | %400 ppm max |
| $Fe^{+3}$: | 10 ppm max |
| Insoluble: | %0.05 max |
| Pb: | 5 ppm max |
| As: | 3 ppm max |
| Hg: | 1 ppm max |
| Cu: | 30 ppm max |
| TOC: | 40 ppm max |

In order to control the impurities accumulating within the process, part of the filtrate (143) effluent from the monohydrate centrifuging system (140) is purged. Although concentrated with impurities, the purge stream is used in further processes since it is also rich in total alkalinity. A portion of the purge (311) having a total alkalinity of 29 to 31% is sent to deca/sesqui crystallization process (310). The slurry (312) including decahydrate or sesquicarbonate crystals obtained at the cooling type crystallizer is fed to the centrifuging process (320).

When decahydrate crystal production is carried out in the deca/sesqui process, caustic soda (531) is injected to the cooling crystallization feed solution (311) via a dozing pump and thus the concentration of 2 to 4.5% bicarbonate concentration is partly neutralized. Following the neutralization, the solution is diluted down to 20 to 25% total alkalinity with water. The neutralized solution is cooled down at 15 to 30° C. in the deca/sesqui cooling crystallizer (310) and thus decahydrate crystal slurry is obtained. Chilled water at a temperature of 5 to 7° C. is used as a cooling medium. The slurry (312) is sent to the centrifuging process (320) and separated as decahydrate crystals having 1 to 3% free moisture (321) and filtrate (322). The filtrate (322) effluent from the centrifuging process is discarded as the final purge of the process, whereas the decahydrate crystals (321) are fed to the melting process (330). Here, the decahydrate crystals are melted with the hot solution (331) taken from the evaporation-stripping process. Obtained rich solution (332) is fed back to the monohydrate crystallization process (130).

When sesquicarbonate crystals are produced in the deca/sesqui process, neutralization and dilution is not applied to the solution being fed to the deca/sesqui crystallizer. The solution (311) having 25 to 31% total alkalinity is cooled at 30 to 700° C. in the deca/sesqui crystallizer (310) and thus sesquicarbonate crystals including slurry is obtained. Chilled water at a temperature of 5 to 7° C. is used as a cooling medium. The slurry (312) is sent to the centrifuging process (320) and separated as sesquicarbonate crystals having 3 to 8% free moisture (321) and filtrate (322). The filtrate (322) effluent from the centrifuging process is discarded as the final purge of the process, whereas the decahydrate crystals (321) are fed to the melting process (330). Here, the decahydrate crystals are melted with the hot solution (331) taken from the evaporation-stripping process. Obtained solution (333) is fed back to the evaporation-stripping process (120) since it has a high bicarbonate concentration.

As an alternative, the sesquicarbonate crystals obtained from the deca/sesqui crystallization process may be fed to the calcinations process (430) at the light/medium soda ash production line and thus be recovered as light soda ash product. The mass balance presented herein is prepared without regard to this alternative.

Another portion of the purge (411) taken from the monohydrate centrifuge (140) is fed to the carbonation process (410) for light soda ash production. Here, the solution diluted down to 14 to 17% total alkalinity with process water (412), is directly reacted with the carbon dioxide gas (413) effluent from the evaporation-stripping process (120) and sodium bicarbonate crystals are obtained. The slurry including sodium bicarbonate crystals at a rate of 14 to 15% (414) is sent to the centrifuging process (420) and the bicarbonate crystals with a free moisture content of 3 to 8% (421) is separated from the filtrate (422). The filtrate (422) is disposed as the final purge and the sodium bicarbonate crystals (421) are sent to the calcination process (430) in order to carry out the light soda ash production (431). The calcination is carried out at 150 to 220° C. (e.g., at 180° C.) in a rotary calciner utilizing high pressure (10 to 28 bar absolute) indirect steam.

Another portion of the purge (521) separated from the monohydrate centrifuge (140), is utilized in caustic soda production to be consumed at the deca/sesqui crystallizer. The solution (521) fed to the caustification-clarification process (520) at 60 to 90° C. is diluted to 10 to 20% total alkalinity and reacted with the milk of lime (513) obtained at the milk of lime preparation process (510) in order to caustify it. The process waste (523) is separated from the caustic soda solution (522) within the clarifier and the solution is filtrated (530) in order to take away the rest of the insolubles (532) and thus a caustic soda solution (531) at a concentration of 8 to 15% is obtained.

A portion of the solution (211) effluent from the evaporation-stripping process is cooled down to 70° C. and fed to the cooling type tray carbonation column within the sodium bicarbonate carbonation process (210). The cooled solution is reacted with the carbon dioxide gas (212) effluent from the evaporation-stripping process (120) in the carbonation column and thus sodium bicarbonate crystals are obtained. The carbonation column (210) is at 60 to 75° C., where as the bicarbonate crystal slurry (213) at the exit of the column is at 55 to 65° C. The slurry obtained (213) is fed to the bicarbonate centrifuge (220) where the bicarbonate crystals (221) and bicarbonate filtrate (222) are separated. The filtrate (222) is sent back to the evaporation-stripping process (120). The bicarbonate crystals (221) are sent to the drying-packing (230) process. Drying is carried out at the tray type or fluidized bed driers at 80° C. Since the bicarbonate crystals decompose at temperatures higher than 75° C., it may be important that the residence time during drying is as short as possible. Following the drying process, a stage screening system is used in order to classify the bicarbonate crystals those are in various sizes according to the specifications set by the market. Thus, three distinct classes of refined sodium bicarbonate product are obtained to as pharmaceutical grade, feed grade and technical grade (231).

A portion of the under screen dense soda and the light and dense soda ash dusts held at the dedusting systems (611) is reacted with quartz sand (612) in a vertical kiln at 1400 to 1600° C. and thus sodium silicate (613) is obtained. Feeding different proportions of quartz sand and soda dust to the kiln results in various modules of sodium silicate production. 2 module sodium silicate is produced with a $SiO_2$—$Na_2O$ molar rate of 2:1 and 3 module sodium silicate is produced with a $SiO_2$—$Na_2O$ molar rate of 3:1 in the feed. Sodium silicate effluent from the kiln is cooled through rollers and wire conveyors as pellets and taken into the product silos. Fuel oil, LPG or natural gas, etc., is used as fuel for the calcination process.

Another portion of the under screen dense soda and the light and dense soda ash dusts held at the dedusting systems (711) effluent from the monohydrate drying and packing processes (150) is recrystallized in a rotary crystallizer (710) by spraying hot process condensate (712) at 60 to 100° C. Here, the soda fines smaller than 75 μm are processed to be soda particles greater than 100 μm. The monohydrate crystals (713) so produced are sent to the dense soda drying and packing process (150) and dried.

EXAMPLE 1

The effect of calcium concentration in the crystallizer feed solution on the dense soda ash particle size distribution is studied in Eti Soda Inc. Soda Ash Pilot Production Plant. Milk of lime is injected to the crystallizer feed solution for this purpose. The relationship is indicated in the graph.

Figure 2:
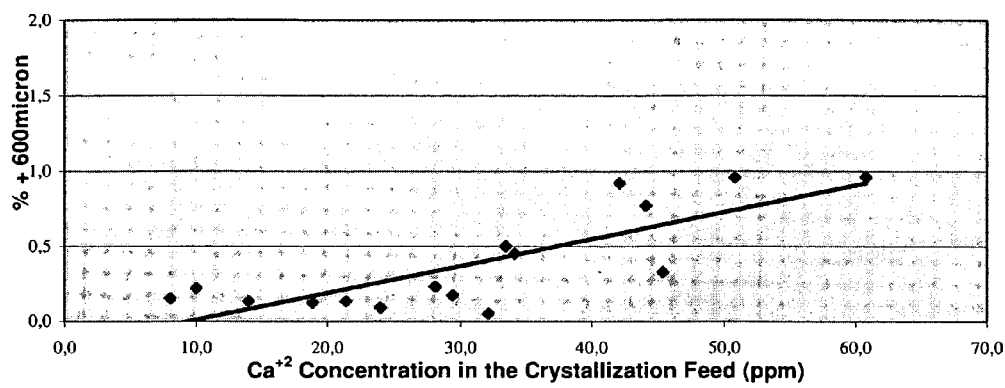
FIG. 2 illustrates the relation of calcium concentration in the crystallization feed and the percentage of particles greater than 600 microns in dense soda ash.
Figure 3:
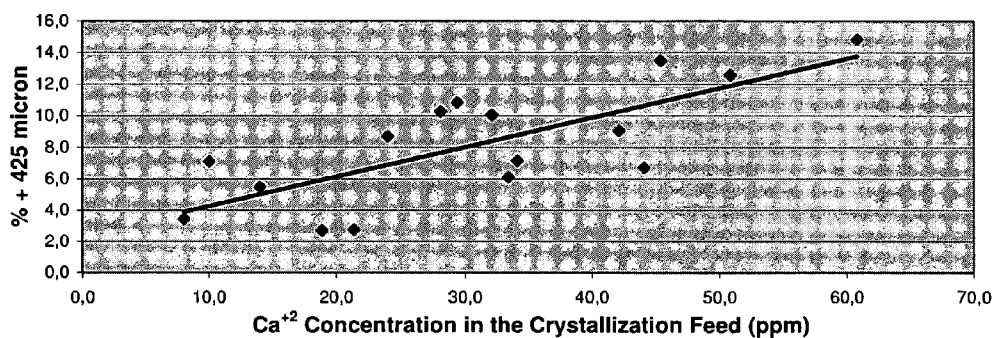
FIG. 3 illustrates the relation of calcium concentration in the crystallization feed and the percentage of particles greater than 425 microns in dense soda ash.
Figure 4:
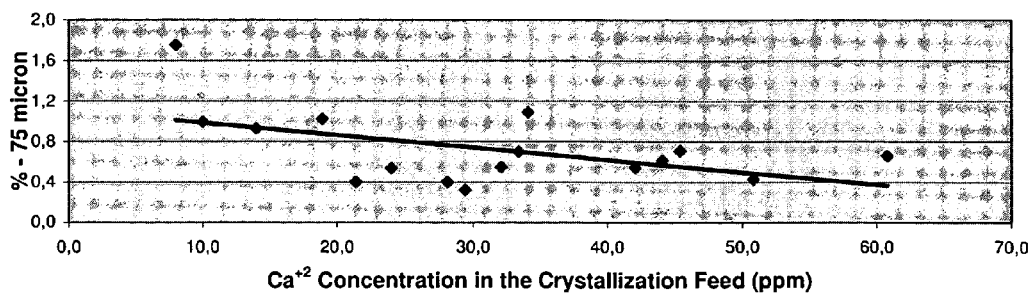
FIG. 4 illustrates the relation of calcium concentration in the crystallization feed and the percentage of particles smaller than 75 microns in dense soda ash.

As illustrated in FIGS. 2 to 4, as the calcium ion concentration in the crystallizer feed solution (131) increases, the percentage of the particles greater than 600 μm and 425 μm increases whereas the percentage of the particles smaller than 75 μm decreases in the dense soda ash product. As clear, the existence of the calcium ion within the crystallization feed solution (131) enhances the dense soda ash product (151) particle size.

EXAMPLE 2

The process indicated in FIG. 1 is for a process that may produce 1,000,000 metric ton/year dense soda ash, 100,000 metric ton/year sodium bicarbonate, 100,000 metric ton/year light soda ash and 30,000 metric ton/year sodium silicate. The mass balance for such a process is given below.

| DECAHYDRATE/SESQUICARBONATE PROCESS: 500 | | | | | |
|---|---|---|---|---|---|
| | 531 Caustic Soda Solution | 311 Decahydrate/ Sesquicarbonate Crystallization Feed | 321 Wet Decahydrate Crystals | 322 Decahydrate Mother Liquor | 332 Decahydrate Melt |
| Na$_2$CO$_3$ (t/hr) | 0.231 | 23.440 | 15.714 | 7.726 | 28.513 |
| NaHCO$_3$ (t/hr) | | | | | 1.256 |
| H$_2$O (t/hr) | 9.43 | 56.186 | 28.804 | 27.382 | 69.749 |
| NaOH (t/hr) | 1.444 | | | | |
| Total | 11.105 | 79.627 | 44.518 | 35.109 | 99.518 |

| DENSE SODA ASH PRODUCTION PROCESS: 100 | | | | | | |
|---|---|---|---|---|---|---|
| | 111 Purified Solution | 121 Evaporation & Stripping Feed | 131 Monohydrate Crystallizer Feed | 514 Milk of Lime | 132 Monohydrate Slurry | 141 Wet Monohydrate Crystals | 151 Dense Soda Ash Product |
| Na$_2$CO$_3$ (t/hr) | 126.240 | 126.200 | 163.118 | | 272.430 | 131.013 | 126.582 |
| NaHCO$_3$ (t/hr) | 63.120 | 72.900 | 14.470 | | 18.965 | | |
| H$_2$O (t/hr) | 862.640 | 952.600 | 500.373 | 0.047 | 340.606 | 33.783 | |
| Monohydrate (t/hr) | | | | | 158.000 | 153.260 | |
| CaO (t/hr) | | | | 0.190 | | | |
| Total | 1052.00 | 1151.700 | 677.960 | 0.237 | 632.000 | 164.796 | 126.5823 |

| SODIUM BICARBONATE PRODUCTION PROCESS: 200 | | | | | |
|---|---|---|---|---|---|
| | 211 Bicarbonate Carbonation Feed | 212 Carbon Dioxide | 213 Bicarbonate Slurry | 221 Wet Bicarbonate Crystals | 231 Sodium Bicarbonate Product |
| Na$_2$CO$_3$ (t/hr) | 13.349 | | | | |
| NaHCO$_3$ (t/hr) | 1.310 | | 22.466 | 13.038 | 12.658 |
| H$_2$O (t/hr) | 42.706 | | 73.543 | 0.652 | |
| CO$_2$ (t/hr) | | 7.758 | | | |
| Crystal | | | 13.441 | 13.038 | 12.658 |
| Total | 57.365 | 7.758 | 96.009 | 13.690 | 12.658 |

| LIGHT SODA ASH PRODUCTION PROCESS: 400 | | | | | | |
|---|---|---|---|---|---|---|
| | 411 Light Soda Carbonation Feed | 412 Dilution Water | 413 Carbon Dioxide | 414 Bicarbonate Slurry | 421 Wet Bicarbonate Crystals | 431 Light Soda Ash Product |
| Na$_2$CO$_3$ (t/hr) | 21.184 | | | | | |
| NaHCO$_3$ (t/hr) | 2.925 | | | 34.913 | 20.261 | 12.658 |
| H$_2$O (t/hr) | 48.991 | 74.162 | | 114.286 | 1.762 | |
| CO$_2$ (t/hr) | | | 11.730 | | | |
| Crystal | | | | 20.888 | 20.261 | 12.658 |
| Total | 73.100 | 74.162 | 11.730 | 149.199 | 22.023 | 12.658 |

SODIUM SILICATE PRODUCTION PROCESS: 600

|  | 611 Silicate Furnace Feed | 612 Quartz Sand | 613 Sodium Silicate Product |
|---|---|---|---|
| $Na_2CO_3$ (t/hr) | 1.623 | | |
| $SiO_2$ (t/hr) | | 2.848 | |
| $Na_2SiO_3$ (t/hr) | | | 3.797 |
| Total | 1.623 | 2.848 | 3.797 |

ROTARY CRYSTALLIZER PROCESS: 700

|  | 711 Rotary Crystallizer Feed | 712 Water | 713 Wet Monohydrate Crystals |
|---|---|---|---|
| $Na_2CO_3$ (t/hr) | 2.807 | | 2.807 |
| $H_2O$ (t/hr) | | 0.548 | 0.164 |
| Monohydrate (t/br) | | | 3.284 |
| Total | 2.807 | 0.548 | 2.971 |

CAUSTIC SODA PROCESS: 500

|  | 513 Milk of Lime | 521 Caustification Feed | 522 Caustic Solution | 523 Clarification Waste | 531 Caustic Soda Solution | 532 Waste |
|---|---|---|---|---|---|---|
| $Na_2CO_3$ (t/hr) | | 2.145 | 0.244 | 0.013 | 0.231 | 0.012 |
| $NaHCO_3$ (t/hr) | | 0.296 | | | | |
| $H_2O$ (t/hr) | 7.366 | 4.959 | 9.657 | 2.668 | 9.430 | 0.227 |
| CaO (t/hr) | 1.557 | | | 0.171 | | |
| $CaCO_3$ (t/hr) | 0.285 | | 0.055 | 2.704 | | 0.055 |
| NaOH (t/hr) | | | 1.488 | 0.078 | 1.444 | 0.044 |
| Total (t/hr) | 9.207 | 7.400 | 11.444 | 5.634 | 11.105 | 0.338 |

EXAMPLE 3

Sodium Hydroxide pilot scale production is carried out by "soda-lime method" at the Eti Soda Inc. Dense Soda Ash Pilot Production Plant. During this pilot scale production, 7.05 tons of lime is reacted with 34.4 m³ Of trona solution having 168.8 g/lt $Na_2CO_3$ total alkalinity. 15.3 m³ of caustic soda solution is obtained at a concentration of 150.2 g/lt (13.0%) NaOH. The overall sodium carbonate conversion rate is 89.0% at the end of caustification. This caustic solution is evaporated and 2.1 m³ of concentrated caustic solution with a total alkalinity of 666.7 g/lt (46.2%) NaOH. Caustictification is carried out at 70° C.

What is claimed is:

1. A method for producing sodium chemicals from bicarbonate-including solutions obtained by solution mining of at least one of (a) trona, (b) nahcolite and (c) wegscheiderite reserves and lake waters including bicarbonates, comprising:
purification and preheating;
centrifuging;
drying and packing;
converting a portion of a purge taken away from a system to decahydrate and sesquicarbonate crystals with a reduced impurity content in a deca/sesqui crystallization process;
recovering the crystals in an evaporation-stripping process, a light soda calcination process and a monohydrate crystallization process;
wherein the deca/sesqui crystallization process includes one of (a) obtaining decahydrate crystals by caustic soda addition and crystallization at 15 to 30° or (b) obtaining sesquicarbonate crystals by crystallization at 30 to 70° C. without caustic soda addition and thus production of two different crystals within a single crystallizing system by changing the process parameters; and
producing the caustic soda to be used in the deca/sesqui crystallization process by processing a portion of a purge taken away from the monohydrate centrifuging process together with milk of lime through a caustification-clarification and filtration processes.

2. The method according to claim 1, further comprising:
converting soda ash fines effluent from the drying and packing step by a recrystallization in a rotary crystallizer to monohydrate crystals; and
recovering crystals obtained by the recrystallization as dense soda ash after drying in the drying and packing step.

3. The method according to claim 1, further comprising a melting process in which the crystals effluent from the deca/sesqui crystallization process are melted, obtained decahydrate solution is sent to the monohydrate crystallization process and obtained sesquicarbonate solution is sent to the evaporation-stripping process.

4. The method according to claim 3, wherein a concentrated solution effluent from the evaporation-stripping process is used for the melting process.

5. The method according to claim 4, wherein the monohydrate crystallization process includes injecting milk of lime obtained in a milk of lime preparation process to a monohydrate crystallizer feed solution by dosing pumps.

6. The method according to claim 5, wherein the milk of lime is injected to the monohydrate crystallizer feed solution sufficient to maintain a calcium concentration in the crystallizer feed solution at 20 to 60 ppm.

7. The method according to claim 1, wherein low pressure steam and mechanical vapor compressors are used as a heat source.

8. The method according to claim 1, further comprising converting fine soda dusts obtained from the drying and packing process to monohydrate crystals within a rotary crystallizer by spraying hot process condensate at 60 to 100° C.

9. A method for producing sodium chemicals from bicarbonate-including solutions obtained by solution mining of at least one of (a) trona, (b) nahcolite and (c) wegscheiderite reserves and lake waters including bicarbonates, comprising:
purification and preheating;
centrifuging;
drying and packing;
converting a portion of a purge taken away from a system to decahydrate and sesquicarbonate crystals with a reduced impurity content in a deca/sesqui crystallization process;
recovering the crystals in an evaporation-stripping process, a light soda calcination process and a monohydrate crystallization process;

wherein the deca/sesqui crystallization process includes one of (a) obtaining decahydrate crystals by caustic soda addition and crystallization at 15 to 30° or (b) obtaining sesquicarbonate crystals by crystallization at 30 to 70° C. without caustic soda addition and thus production of two different crystals within a single crystallizing system by changing the process parameters; and producing sodium bicarbonate by treating a portion of a concentrated solution taken from the evaporation-stripping process by a carbonation process, a centrifuging process and a drying process.

10. The method according to claim 9, wherein the carbonation process is performed with a portion of carbon dioxide effluent from the evaporation-stripping process.

11. The method according to claim 10, further comprising feeding a filtrate effluent from the centrifuging process to the evaporation-stripping process.

12. A method for producing sodium chemicals from bicarbonate-including solutions obtained by solution mining of at least one of (a) trona, (b) nahcolite and (c) wegscheiderite reserves and lake waters including bicarbonates, comprising:

purification and preheating;
centrifuging;
drying and packing;
converting a portion of a purge taken away from a system to decahydrate and sesquicarbonate crystals with a reduced impurity content in a deca/sesqui crystallization process;
recovering the crystals in an evaporation-stripping process, a light soda calcination process and a monohydrate crystallization process;
wherein the deca/sesqui crystallization process includes one of (a) obtaining decahydrate crystals by caustic soda addition and crystallization at 15 to 30° or (b) obtaining sesquicarbonate crystals by crystallization at 30 to 70° C. without caustic soda addition and thus production of two different crystals within a single crystallizing system by changing the process parameters;
sending sesquicarbonate crystals effluent from the deca/sesqui crystallization process to a calcination process to produce at least one of light or medium soda ash; and
treating a portion of a purge taken from the monohydrate centrifuging process by a carbonation process, a filtration process and the calcination process.

13. A method for producing sodium chemicals from bicarbonate-including solutions obtained by solution mining of at least one of (a) trona, (b) nahcolite and (c) wegscheiderite reserves and lake waters including bicarbonates, comprising:

purification and preheating;
centrifuging;
drying and packing;
converting a portion of a purge taken away from a system to decahydrate and sesquicarbonate crystals with a reduced impurity content in a deca/sesqui crystallization process;
recovering the crystals in an evaporation-stripping process, a light soda calcination process and a monohydrate crystallization process;
wherein the deca/sesqui crystallization process includes one of (a) obtaining decahydrate crystals by caustic soda addition and crystallization at 15 to 30° or (b) obtaining sesquicarbonate crystals by crystallization at 30 to 70° C. without caustic soda addition and thus production of two different crystals within a single crystallizing system by changing the process parameters;
sending sesquicarbonate crystals effluent from the deca/sesqui crystallization process to a calcination process to produce at least one of light or medium soda ash; and
performing a carbonation process with a portion of carbon dioxide effluent from the evaporation-stripping process.

14. A method for producing sodium chemicals from bicarbonate-including solutions obtained by solution mining of at least one of (a) trona, (b) nahcolite and (c) wegscheiderite reserves and lake waters including bicarbonates, comprising:

purification and preheating;
centrifuging;
drying and packing;
converting a portion of a purge taken away from a system to decahydrate and sesquicarbonate crystals with a reduced impurity content in a deca/sesqui crystallization process;
recovering the crystals in an evaporation-stripping process, a light soda calcination process and a monohydrate crystallization process;
wherein the deca/sesqui crystallization process includes one of (a) obtaining decahydrate crystals by caustic soda addition and crystallization at 15 to 30° or (b) obtaining sesquicarbonate crystals by crystallization at 30 to 70° C. without caustic soda addition and thus production of two different crystals within a single crystallizing system by changing the process parameters; and
producing sodium silicate by sending under screen dense soda and fine soda dusts held at a dedusting system in the drying and packing process to a furnace together with quartz sand.

* * * * *